United States Patent Office 3,057,686
Patented Oct. 9, 1962

3,057,686
PROCESS FOR PREPARING SILANES
Earl L. Muetterties, Chadds Ford, Pa., assignor to E. I. du Pont de Nemours and Company, Wilmington, Del., a corporation of Delaware
No Drawing. Filed Aug. 1, 1957, Ser. No. 675,576
6 Claims. (Cl. 23—204)

This invention relates to compounds containing hydrogen bonded to silicon and to a new and improved method for preparing them. More particularly, the invention is directed to the preparation of silane, $SiH_4$.

Compounds containing hydrogen bonded to silicon, that is, the silanes, are useful as intermediates in the preparation of difficultly accessible organic silicon products. For example, silanes add readily to compounds containing olefinic bonds to form alkyl-substituted silanes; they combine readily with oxygen to form siloxanes. The silicon compounds so obtained are useful in the fields of plastics, resins and textile finishing agents.

Heretofore, compounds containing hydrogen bonded to silicon have been difficult to prepare. They have been obtained by the reaction of dilute mineral acids with magnesium silicide and by direct reaction of silicon with hydrogen in an electric discharge. They have also been prepared by methods which require high temperatures, up to 2000° C., by reaction of halosilanes with hydrogen in the presence of aluminum, magnesium or silicon. Yields in these processes are generally low and unsatisfactory. Other methods employ inflammable solvents and large quantities of high-cost chemicals.

An object of the present invention is therefore, provision of an improved method for preparing compounds containing hydrogen bonded to silicon in good yield and at relative low temperatures. A further object is to provide a process for preparing silanes which employs low-cost chemicals as starting materials.

The above-mentioned and still further objects are achieved in accordance with this invention by a process which comprises reacting a halosilane of the formula $$R_nSiX_{(4-n)}$$

in which R is a member of the group consisting of hydrogen and monovalent hydrocarbon radicals, X is a halogen atomic number 9 to 35 inclusive, and $n$ is a cardinal number no greater than 3, i.e., whose value is 0, 1, 2 or 3, with hydrogen at a temperature below about 250° C. and at superatmospheric pressure in the presence of oxygen-free aluminum metal.

It will be understood that an essential feature of the process of the invention is the presence of substantially oxygen-free aluminum metal, that is, aluminum metal which is free of an oxygen-containing surface film. A second essential feature of my novel process is the use of superatmospheric pressure.

It is well known that the surface of every aluminum particle is covered with a thin but very tenaciously adhering layer of oxide which reduces greatly the chemical activity of the metal. Removal of this film of oxide provides a highly active form of metal. Aluminum metal from which this surface film has been removed is referred to herein as "activated." In other words, an activated aluminum metal is defined for purposes of this invention as a metal having an essentially oxygen-free surface.

In the process of the invention, the reaction is conducted preferably in the presence of a chemical composition which activates the surface of the aluminum metal. The activating chemical composition can be present either in minor quantities or it can be present in substantial quantities in the reaction system. Two preferred general methods for obtaining oxygen-free metal surfaces are described below.

In one preferred manner of operating the process of this invention, there is added to the reaction mixture a minor quantity of a chemical composition which catalyzes the removal of oxygen from the surface of the aluminum. Three groups of compositions suitable for such use in the process of the invention are (1) metal hydrides, (2) mixtures of iodine and an alkyl halide in which the halogen has an atomic number of at least 17, and (3) trialkyl aluminum compounds.

The hydrides suitable for catalyzing the removal of oxygen from the surface of the aluminum in my process are hydrides of the elements of the periodic table which are metals as set forth in Deming's "General Chemistry," John Wiley & Sons, Inc., 5th ed., chap. 11. The preferred hydrides are the hydrides of metals of atomic number 3 through 56 of groups I–A, II–A, and III–A of the periodic table as set forth in Deming's "General Chemistry," referred to above. Examples of this group of catalysts are lithium hydride, sodium hydride, barium hydride, strontium hydride, and diisobutyl aluminum hyride. Mixed hydrides, such as, for example lithium aluminum hydride, are also operable.

Examples of alkyl halides which can be used in combination with iodine in the process of the invention are methyl chloride, ethyl chloride, ethyl bromide, butyl bromide, octyl bromide, methyl iodide, and ethyl iodide. The number of carbon atoms in the alkyl group of the alkyl halide is not critical but for reasons of availability, those with 1 to 8 carbons, inclusive, are preferred. The molar ratio of halide to iodine is not critical. It can be as low as 30:1 and as high as 1:1, the preferred range lying between about 20:1 and 2:1.

Illustrative of the trialkyl aluminum compounds which can be used in my novel process, to catalyze the removal of oxygen from the metal surface, are triethyl aluminum, triisopropyl aluminum, triisobutyl aluminum and trihexyl aluminum. The length of the alkyl chain in the trialkyl aluminum compounds is not critical. Preferably, for reasons of accessibility of compounds, the chain length of the alkyl group does not exceed four carbons.

It will be understood that in the above-preferred method for activating the aluminum in the process of this invention only minor amounts of the activating composition are employed. The quantity of activating agents generally ranges from 0.1% to 10% of the weight of the aluminum employed in the process; the preferred quantity lies between 1.5% and 5.0%.

In a second preferred method of operating the process of the invention, the aluminum metal is dispersed in a composition which contains an aluminum trihalide alone or in combination with one or more halides of the elements of groups I–A, II–A and II–B of the periodic table which have atomic numbers less than 80 and in which the halogens have atomic numbers lying between 17 and 53, inclusive, the halide composition being inert to silane under the reaction conditions. The periodic table referred to herein is that set forth in Deming's "General Chemistry," to which reference has already been made.

The preferred compositions in this second mode of operating the process of the invention are mixtures of an aluminum trihalide with one or more alkali or alkaline earth metal halides, that is, with one or more of the halides of metals of groups I–A and II–A. The proportions of the different metal halides in the reaction medium are not critical, mixtures containing as little as 1% of the alkali or alkaline earth metal halides being operable. Compositions which are especially preferred are mixtures of aluminum trichloride or aluminum tribromide with alkali and alkaline earth metal chlorides and bromides which contain 50 or more mole percent of the aluminum trihalide. These compositions are preferred since they are molten under the conditions of the reaction and permit intimate mixing of the reactants. However, it is not essential that the composition be molten under the conditions of the reaction in order to obtain silanes.

Metal halide compositions which can be used include aluminum trichloride, aluminum tribromide, aluminum triiodide and mixtures of these halides with lithium chloride, lithium bromide, sodium chloride, sodium bromide, barium chloride, zinc chloride, zinc bromide, cadmium chloride, cadmium bromide, and cadmium iodide. Examples illustrative of specific operable metal halide compositions, stated as weight percent, are:

(1) aluminum chloride (100%),
(2) aluminum chloride (80%)-sodium chloride (20%),
(3) aluminum bromide (80%)-sodium chloride (10%)-potassium chloride (10%),
(4) aluminum iodide (50%)-sodium iodide (30%)-potassium iodide (20%),
(5) aluminum chloride (99%)-sodium chloride (1%), and
(6) aluminum chloride (60%)-sodium chloride (30%)-zinc chloride (10%).

It should be understood that the bromide or iodide can be used in place of the chloride in the above mixed compositions.

The weight ratio of aluminum metal to the metal halide composition is not critical and will generally lie between about 1:1 and about 1:30. The preferred weight ratio of aluminum metal to the metal halide composition lies between about 1:5 and 1:20.

The two preferred methods described above for activating the aluminum metal in situ in the process of the invention can be used separately or they can be combined. For example, the silicon halide, aluminum and hydrogen can be reacted in a combination of an aluminum chloride-lithium chloride melt containing a catalytic quantity of lithium hydride.

The silicon halides which can be employed as reactants in the process include the fluorides, bromides and chlorides. They can be used in pure form or as mixed halides. Commercially available products are suitable for use in the process. There can be employed in the process tetrahalosilanes, trihalosilanes, dihalosilanes and monohalosilanes. Examples of compounds which can be employed are silicon tetrachloride, trichlorosilane ($HSiCl_3$), dichlorosilane ($H_2SiCl_2$), monobromosilane ($H_3SiBr$), and monofluorosilane ($H_3SiF$). Other compounds which can be used are tributylchlorosilane, dihexyldichlorosilane, monooctyltrichlorosilane, monododecyltrichlorosilane, tricyclohexylchlorosilane, diphenyldichlorosilane, and triphenylchlorosilane. The corresponding bromides and fluorides can be employed. The above examples are illustrative of the broad range of halosilanes which can be used and include aliphatic, cycloaliphatic and aryl-substituted halosilanes. In the general formula, $R_nSiX_{(4-n)}$, referred to earlier, when R is a hydro carbon radical the number of carbon atoms in the hydrocarbon group is not critical but preferably does not exceed 12. In an especially preferred form of the invention, R is an alkyl radical of 1–12 carbons. These compounds are preferred because they are more readily available than other compounds and give higher yields of the desired products.

Commercially available aluminum metal can be used in the process. The metal can be employed in the form of shavings, wire, coarse pellets or powder. It is preferably employed in comminuted form to provide maximum surface exposure to the reactants.

The hydrogen used in the process is preferably substantially oxygen-free.

Part or all of the halogen present in the halosilane can be replaced with hydrogen in the process of the invention. For example, silicon tetrachloride can be reduced in the process to yield silane ($SiH_4$), monochlorosilane ($H_3SiCl$), dichlorosilane ($H_2SiCl_2$), and trichlorosilane ($HSiCl_3$); phenyltrichlorosilane can be reduced to monophenylsilane [$H_3Si(C_6H_5)$], monophenylchlorosilane [$H_2SiCl(C_6H_5)$], and monophenyldichlorosilane [$HSiCl_2(C_6H_5)$]; diethyldibromosilane can yield diethylsilane [$H_2Si(C_2H_5)_2$] and diethylbromosilane [$HSiBr(C_2H_5)_2$]. The process of the invention can also yield compounds which contain silicon to silicon bonds. For example, disilane can be obtained from hexachlorodisilane.

The process of the invention is conveniently conducted in a corrosion-resistant reaction vessel, such as, for example, a pressure vessel lined with stainless steel, capable of withstanding the pressure at which the reaction is run. The vessel can be flushed with an inert gas, for example, helium or nitrogen, to remove the air and then charged with the solid and liquid reactants. An optional procedure consists in charging the vessel with the solid and liquid reactants, chilling the vessel and contents to about −80° C. in a solid carbon dioxide-acetone bath, and evacuating the closed vessel to a low pressure to remove air and oxygen. Hydrogen is then pressured into the reaction vessel until the desired pressure is obtained.

The proportions of the major reactants, that is, the silicon halide, comminuted metal and hydrogen, are not critical. In the preferred process an excess of hydrogen and metal is used, based on the silicon halide used in the charge. The reaction mixture is heated to the desired operating temperature which usually lies between about 100° and 250° C. The preferred temperature range lies between 125 and 225° C. The reduction is carried out under a hydrogen pressure of at least 50 atmospheres; the preferred pressure range lies between about 100 atmospheres and 1500 atmospheres. The reaction mixture is preferably agitated by suitable means during the reaction period which may be as long as 25 hours. Mixing aids, for example, stainless steel balls, may be present during the reaction. The reaction time is dependent on the other reaction conditions but will generally lie between about 0.5 hour and about 15 hours.

After the hydrogenation is completed, the reaction vessel is cooled to 80° C. or lower, preferably to 20–30° C., and the gaseous reaction products are vented by suitable means into a trap or series of traps which are cooled to a temperature sufficiently low to condense the gaseous products of the reaction. The reaction products, namely, the silanes, can be isolated by conventional means, such as, for example, by fractional distillation. The composition of the condensable gases can be determined readily by means of the mass spectrometer.

While in the procedure as described above the process is conducted batchwise, it can also be conducted by a continuous process, for example, by passing the liquid and gaseous reactants through a reactor containing aluminum particles and the activator which is heated to the desired temperature and maintained at a pressure of at least 50 atmospheres. Much shorter reaction times, as little as one minute or less, are needed in this method of conducting the reaction. Unreacted components can be recycled to obtain maximum conversion.

The process of this invention is illustrated in further detail by the following examples, in which the proportions are expressed in parts by weight unless otherwise specified.

EXAMPLE I

This three-part example illustrates the application of the process to tetrahalosilanes in which a metal hydride is used to activate the aluminum metal.

Part A

A pressure vessel, lined with stainless steel, is flushed with helium and then charged with 30 parts of silicon tetrachloride, 20 parts of comminuted aluminum metal (20–80 mesh), 0.5 part of lithium aluminum hydride, and 30 stainless steel balls (⅜″ diameter). The vessel is closed and hydrogen is added until a pressure of 400 atmospheres is reached. The vessel is heated to 150° C. while it is shaken. Additional hydrogen is added to the reaction system to increase the pressure therein to 890 atmospheres. The vessel is then heated for 8 hours at a temperature of 150° C., with shaking, at a pressure of 840–890 atmospheres. The vessel is cooled to 80° C. and the volatile products vented slowly into a trap cooled with liquid nitrogen. The condensate is distilled at 0.5 mm. through a trap cooled with solid carbon dioxide-acetone mixture and a trap cooled with liquid nitrogen. There is obtained, in the trap cooled with liquid nitrogen, 4.0 parts of condensate which is shown by mass spectrographic analysis to be silane ($SiH_4$) of 99.0–99.5% purity. Yield: 71%.

Part B

A similar experiment, in which the reactants are heated at 150–153° C. for 6 hours at 960–1000 atmospheres hydrogen pressure, gives silane in approximately 95% yield.

Part C

A similar experiment, in which silicon tetrafluoride, aluminum, hydrogen and a catalytic quantity of lithium aluminum hydride are heated at 200° C. for 6 hours at a pressure of 625 atmospheres, yields principally silane with small amounts of trifluorosilane ($HSiF_3$) and difluorosilane ($H_2SiF_2$).

EXAMPLE II

A pressure vessel similar to that used in Example I is flushed with dry nitrogen and then charged with 20 parts of silicon tetrachloride, 20 parts of comminuted aluminum metal (8–100 mesh), 0.5 part of iodine, 0.5 part of aluminum chloride, and 1.0 part of methyl chloride. The vessel is closed, charged with hydrogen and heated at 150° C. for 5 hours with shaking under 800 atmospheres hydrogen pressure. The vessel is cooled, and the gaseous products vented into a trap cooled with liquid nitrogen. Mass spectrographic analysis of the condensate showed that it contained silane, dichlorosilane, trichlorosilane and very small amounts of methylsilanes.

EXAMPLE III

Using the procedure described in Example I, a pressure vessel is charged with 30 parts of silicon tetrachloride, 20 parts of comminuted aluminum metal (20–80 mesh), 1.5 parts of ethyl iodide, 0.4 part of iodine, 0.4 part of aluminum chloride, and 15 stainless steel balls (⅜" diameter). The reaction vessel is sealed, pressured with hydrogen and heated, with shaking, at 150–154° C. for 5 hours under a hydrogen pressure of 790 atmospheres. The major component of the volatile reaction products, collected as described in Example I, is shown by mass spectrographic analysis to be silane with smaller amounts of monochlorosilane and dichlorosilane.

It will be noted that Examples II and III illustrate the application of the process of the invention in which an alkyl halide and iodine are used to activate the aluminum metal. Aluminum chloride can be used with the alkyl halide and iodine but is not essential in this group for activation of the aluminum metal.

EXAMPLE IV

This example illustrates the application of the process of the invention in which a trialkyl aluminum compound is used to activate the metal.

Using the procedure described in Example I, a pressure vessel is charged with 30 parts of silicon tetrachloride, 20 parts of comminuted aluminum metal (20–80 mesh), 0.4 part of triisobutyl aluminum and 30 stainless steel balls (⅜" diameter). The pressure vessel is closed, pressured with hydrogen and heated with shaking for 4 hours at 150° C. at a hydrogen pressure of 900–990 atmospheres. There is obtained from the reaction 0.5 part of silane.

EXAMPLE V

This example has been included to illustrate the application of the process to a hydrocarbon substituted halosilane.

Using the procedure described in Example I, a pressure vessel is charged with 30 parts of diethyldichlorosilane, $(C_2H_5)_2SiCl_2$, 12 parts of comminuted aluminum metal (20–80 mesh), 0.3 part of lithium aluminum hydride and 30 stainless steel balls (⅜" diameter). After the vessel is closed and pressured with hydrogen, it is agitated and heated at 150° C. for 8 hours under a hydrogen pressure of 950 atmospheres. The pressure vessel is cooled to 80° C. and the volatile materials condensed in a trap cooled with liquid nitrogen. The condensate is shown by mass spectrographic analysis to contain diethylsilane, $(C_2H_5)_2SiH_2$, and a small amount of monoethylsilane, $C_2H_5SiH_3$.

Examples VI, VII, and VIII which follow illustrate an application of the process of the invention in which a composition comprising a metal halide is employed to activate the aluminum metal.

EXAMPLE VI

A pressure vessel similar to that used in Example I is purged with nitrogen gas and charged with 30 parts of silicon tetrachloride, 20 parts of comminuted aluminum metal (20–80 mesh), 113 parts of aluminum chloride, 30 parts of sodium chloride, and 30 stainless steel balls (⅜" diameter). Hydrogen is charged into the vessel to a pressure of 400 atmospheres at 26° C. The closed vessel is heated to 168° C. and additional hydrogen is added to bring the pressure up to 800 atmospheres. The vessel is shaken mechanically for 4 hours at 168–173° C. under autogenous pressure (775–800 atmospheres). After cooling the vessel to approximately 25° C., the volatile reaction products are collected as described in Example I. There is obtained 4.7 parts of silane ($SiH_4$) of 99% purity. This quantity of silane represents 84% conversion of the silicon tetrachloride.

EXAMPLE VII

The experiment of Example VI is repeated except that the hydrogen pressure is maintained at 105 atmospheres during the reaction. There is obtained 1.8 parts of silane, representing 32% conversion of silicon tetrachloride.

EXAMPLE VIII

This example illustrates the operation of the process of the invention at a temperature below the melting point of the aluminum trihalide reaction medium.

Using the procedure described in Example I, a pressure vessel is charged with 33 parts of silicon tetrachloride, 20 parts of comminuted aluminum metal (20–80 mesh), 113 parts of anhydrous aluminum chloride, and 30 stainless steel balls. The vessel is closed and hydrogen is added until a pressure of 400 atmospheres is reached. The vessel is heated to 170° C. with shaking under a hydrogen pressure of 750 atmospheres for 10 hours. The reaction vessel is cooled to ambient temperature (25 to 30° C.) and the volatile products are vented slowly into a series of two traps cooled with liquid nitrogen. There is obtained 1.3 parts of silane. Yield, 21%. Some unchanged silicon tetrachloride is also recovered.

For control purposes and solely to illustrate the necessity of employing a composition which will provide an oxygen-free metal surface in the process of the invention, an experiment similar to that described in Example I was performed with the exception that no activator was present. In this experiment, the pressure vessel was charged with 30 parts of silicon tetrachloride, 20 parts of aluminum powder (20–80 mesh), and 30 stainless steel balls. The vessel was pressured with hydrogen and heated with shaking for 6 hours at 170° C. under a hydrogen pressure of 800 atmospheres. There was obtained only 0.1 part of condensate from the reaction products which was shown by mass spectrographic analysis to contain at most 3% (that is, .003 part) of silane.

The process as illustrated in the foregoing examples can be operated at a pressure as low as 50 atmospheres. However, the yield of silanes obtained at the lower pressures is generally less than the yield obtained at the higher pressures.

Silicon compounds other than those already shown which can be prepared by the process of this invention include triethylsilane from triethylchlorosilane, aluminum metal, hydrogen and a minor quantity of lithium hydride; dioctylsilane from dioctyldibromosilane, aluminum metal, hydrogen and a minor amount of sodium hydride; monobutylsilane from butyltrichlorosilane, aluminum, hydrogen and a minor quantity of iodine and butyl chloride; cyclohexylsilane from cyclohexyltrichlorosilane, aluminum powder and hydrogen in a mixture of potassium chloride and aluminum chloride; and diphenylsilane from diphenyldichlorosilane, aluminum, hydrogen and a minor quantity of barium hydride in a mixture of sodium chloride and aluminum chloride.

Obvious modifications in the present process will occur to those skilled in the art. Consequently, I propose to be bound solely by the appended claims.

The embodiments of the invention in which an exclusive property or privilege is claimed are defined as follows:

1. The process of preparing compounds containing hydrogen bonded to silicon which comprises reacting a halosilane of the formula $$R_nSiX_{(4-n)}$$

wherein R is a member of the group consisting of hydrogen and monovalent hydrocarbon radicals, X is a halogen of atomic number 9 to 35 inclusive, and $n$ is a cardinal number no greater than 3, with hydrogen at a temperature of up to about 250° C. and at a pressure of at least 50 atmospheres in the presence of chemically activated aluminum metal.

2. A method for preparing silanes which comprises heating together a halosilane of the formula $$R_nSiX_{(4-n)}$$

wherein R is a member of the group consisting of hydrogen and monovalent hydrocarbon radicals, X is a halogen of atomic number 9 to 35 inclusive, and $n$ is a cardinal number no greater than 3, and hydrogen in the presence of chemically activated aluminum metal, said metal being essentially free of any oxygen-containing surface film, at a temperature of about 100–250° C. and a pressure of at least about 50 atmospheres.

3. The process of claim 1 wherein the aluminum metal is activated by effecting the reaction between said halosilane and hydrogen in the presence of a composition selected from the class consisting of metal hydrides, mixtures of iodine and an alkyl halide in which the halogen has an atomic number of at least 17, and trialkyl aluminum compounds.

4. Process for preparing silanes which comprises intimately contactin andg heating to a temperature of from 100 to 250° C. and at a pressure of at least 50 atmospheres a halosilane of the formula $$R_nSiX_{(4-n)}$$

wherein R is a member of the group consisting of hydrogen and monovalent hydrocarbon radicals, X is a halogen of atomic number 9 to 35 inclusive, and $n$ is a cardinal number no greater than 3, with hydrogen and aluminum in an aluminum chloride-lithium chloride melt containing a catalytic quantity of lithium hydride, said catalytic quantity having the numerical value of 0.1% to 10% of the weight of the aluminum.

5. The process of claim 1 wherein the aluminum metal is activated by effecting the reaction between said halosilane and hydrogen in the presence of a composition comprising an aluminum trihalide.

6. The process of claim 1 wherein the aluminum metal is activated by effecting the reaction between said halosilane and hydrogen in the presence of a composition comprising an aluminum trihalide and halides selected from the class consisting of halides of the elements of groups I-A, II-A, and II-B of the Periodic Table having atomic numbers of less than 80, the halogens of said halides having atomic numbers of from 17 to 53, inclusive.

References Cited in the file of this patent
UNITED STATES PATENTS

| | | |
|---|---|---|
| 2,401,323 | Alexander | June 4, 1946 |
| 2,406,605 | Hurd | Aug. 27, 1946 |
| 2,458,703 | Hatcher | Jan. 11, 1949 |
| 2,787,626 | Redman | Apr. 2, 1957 |
| 2,857,414 | Schmidt et al. | Oct. 21, 1958 |
| 2,888,327 | Adams | May 26, 1959 |

OTHER REFERENCES

Ellis: "Hydrogenation of Organic Substances," 3rd edition, 1930, page 627.

Latimer et al.: "Reference Book of Inorganic Chemistry," 3rd edition, 1951, page 92.

Ehret: "Smith's College Chemistry," 6th edition, 1946, pages 242–244.